(No Model.)
G. W. COOK.
CONDUIT FOR ELECTRIC WIRES.
No. 402,565. Patented May 7, 1889.
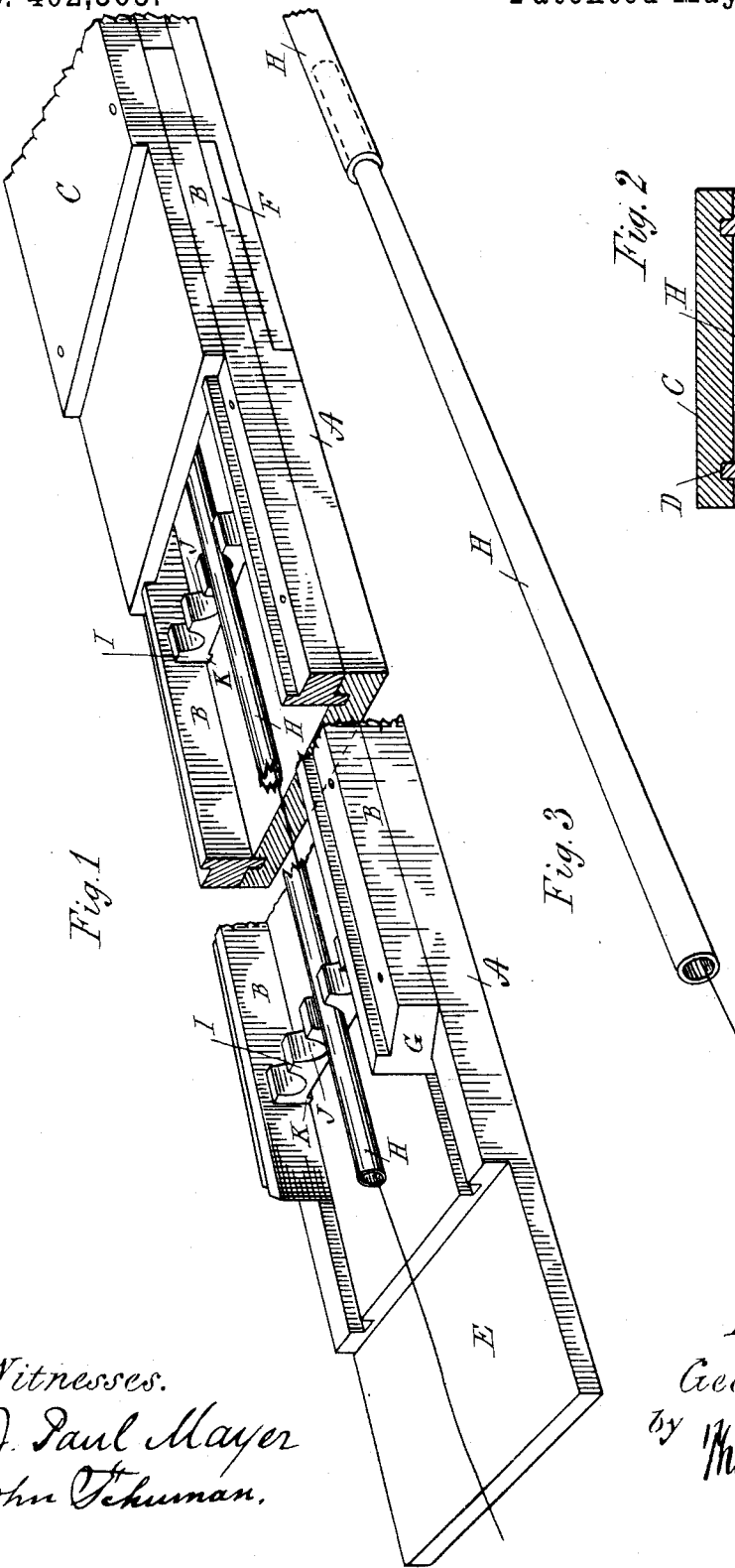
Witnesses.
J. Paul Mayer
John Schuman.
Inventor
Geo. W. Cook
by Max J. Sprague & Son
Atty.

UNITED STATES PATENT OFFICE.

GEORGE W. COOK, OF DETROIT, MICHIGAN, ASSIGNOR OF ONE-THIRD TO CHARLES C. CANNY, OF SAME PLACE.

CONDUIT FOR ELECTRIC WIRES.

SPECIFICATION forming part of Letters Patent No. 402,565, dated May 7, 1889.

Application filed September 5, 1888. Serial No. 284,599. (No model.)

*To all whom it may concern:*

Be it known that I, GEORGE W. COOK, a citizen of the United States, residing at Detroit, in the county of Wayne and State of Michigan, have invented certain new and useful Improvements in Underground Conduits for Electrical Conductors, of which the following is a specification, reference being had therein to the accompanying drawings.

This invention relates to a new and useful improvement in underground conduits for electric wires; and the invention consists in the peculiar construction, arrangement, and combination of parts, whereby perfect insulation and freedom from loss by induction are obtained, while at the same time the conduit can be built at a moderate cost, and at the same time complies with all the requirements found necessary in the application of such devices for laying telephone, telegraph, or electric-light wires underground.

The especial features of my construction consist in the novel manner of insulating the wires, which may be either naked or covered wires in any form; and another feature of my conduit is its peculiar construction in sections of moderate length, whereby the work of laying the conduit may be rapidly executed, all as more fully hereinafter described, and shown in the accompanying drawings, in which—

Figure 1 is a perspective view showing a section of my conduit as in the process of construction. Fig. 2 is a cross-section thereof, and Fig. 3 is a perspective view showing my manner of securing the electric wire in paper tubes.

My conduit consists, first, of an outer box made of well-seasoned lumber, and consists of the bottom A, the sides B B, and the top C, joined together in the form of a rectangular box in sections in the following manner: The sides B B are provided on the inner edges with tenons D, and the top and bottom boards, A and C, are provided with corresponding mortises to receive these tenons. The ends of the bottom and top boards, A and C, are halved, one end being halved on the upper face and the other on the lower face, as shown in Fig. 1, wherein E and F show respectively halved ends of the bottom board of one section. The side boards, B, are cut off at an angle at the ends, as shown at G in Fig. 1, and these sides are secured to the bottom board by nailing or otherwise, and are shorter at one end and correspondingly longer at the other end than the bottom board, so as to break the joint between two sections of conduit. The top board of each section is left unsecured until the conduit is ready to be laid in the ground. Sections of the conduit are thus constructed of a suitable length, say twelve to sixteen feet long, and, if desired, to insure the permanency of the conduit when buried in the ground, the sections of conduit may be previously treated by a wood-preserving process—such as impregnating them with corrosive sublimate or any other of the well-known wood-preservatives—or they may be varnished or painted on the outside. It will be noticed that the sides and the top and bottom of each section are interchangeable, which, in manufacturing the conduit, naturally simplifies the work. Before putting the sides and bottom of each section together the joints may be coated with paint, tar, or similar compound to render such joints tight.

The wires are laid in the conduit in the following manner: I construct paper tubes H of suitable length, say two feet, slightly tapering from one end to the other, so that the tubes may be joined onto each other by inserting the smaller end of one tube into the larger end of another tube, and allow the tubes to telescope each other in that way for a little distance and with the smaller end firmly wedged into the larger end. These tubes have to be of suitable diameter to be readily strung upon the wire or cable which they are intended to inclose. Before using them, however, I treat them to a bath of melted paraffine, in which I dip each tube, so as to coat it thoroughly both inside and out and have it completely impregnated therewith, to which end I preferably use more or less porous material for manufacturing the tubes, which have to be, however, of sufficient stiffness to permit of their being firmly stuck together in the manner described.

In proceeding in laying my conduit I first lay the box, minus the top board, in the bottom of the ditch, as is the usual manner of laying such conduits. Then I place at suitable distances apart insulating bridges I upon the bottom board, preferably of molded glass, and shaped in such a fashion as to form suitable bearings, J, for holding the paper tubes about equidistant between the top and bottom and at regular distances apart, if there are more than one wire or cable to be placed into the conduit. These insulating-bridges I form in such manner that they have the least possible number of contacts with the sides and bottom of the box, there being preferably small lugs K formed on the under side of the bridges, as shown in Fig. 1; or the under side of the bridges may be formed corrugated, as shown in Fig. 2. The object of thus forming the insulating-bridges is not alone to restrict their contact with the boxes, but also to allow an insulating material, with which the boxes are filled up, to flow all around.

In joining the next section the parts which form the joint are first coated with some water-proof material—such as tar or a similar compound—and the laying of the paper tubes which inclose the wire is proceeded with in a similar manner as for the preceding section, care being taken to have every tube firmly inserted with its smaller end into the larger end of the preceding tube before laying any wires in the box. I prefer to coat the box on the inside first with some water-proof compound, preferably a composition of tar, pitch, and paraffine. After one or more sections have received the paper tubes inclosing the wires I fill the whole box full of a compound, preferably of the same kind already described, which I pour in hot, taking care that no empty spaces are left. After filling the box with the compound I lay on the cover, breaking joints, as shown in Fig. 1. It will be noticed that in placing the cover on some of the compound with which the box is filled will be displaced, as the box when open holds more than when closed, on account of the mortise-and-tenon engagement between the sides and the top. Thus the laying of the top insures the complete fullness of the conduit, while at the same time the material is not crowded out on the sides and therefore liable to prevent the formation of a tight joint, but must be displaced endwise.

After laying on the top the latter is secured by nailing it down upon the sides. From experimentally-constructed conduits of this kind I have ascertained that with this manner of insulating the electric wires, the insulation of the wires is absolutely perfect and the moisture of the ground is permanently excluded.

By constructing the paper tubes as described I have found that by merely sticking the tubes into each other, as described, they form air-tight joints, and as the paraffine is not alone insulating, but water-proof, all moisture is absolutely excluded from the interior of the tubes, being besides completely buried into the compound, and the insulation of the paper tubes themselves is absolutely perfect. Thus it is obvious that even a naked wire is absolutely and permanently insulated by my conduit, and induction also reduced to a minimum.

It will be understood that the paper tubes, aside from their insulating quality, insure the parallelism of the wires, thus keeping them out of mutual contact or approach to each other, and also avoiding all possible displacement of the wires within the box.

The construction of the boxes, as well as the manner of constructing the entire conduit, increases the strength of the conduit, which at the same time very favorably compares in price with other conduits.

What I claim as my invention is—

1. In an underground conduit, the combination of the following elements: an outer casing or box, insulating-bridges placed therein at intervals, and an inner conduit or conduits formed of tapering paper tubes supported upon said cross-bridges, substantially as described.

2. In an underground conduit, the combination of the following elements: an outer casing or box of substantially rectangular shape, insulating cross-bridges placed therein at intervals, an inner conduit or conduits consisting of paraffined taper-jointed paper tubes supported upon said cross-bridges, and an insulating water-proof compound filled into the outer conduit, substantially as described.

3. The outer conduit-sections, each consisting of bottom A and sides C, halved upon their ends and provided with longitudinal mortises upon their inner faces, and of the sides D, provided with beveled ends and with longitudinal tenons upon their inner edges engaging with the corresponding mortises in the bottom and top, said bottom, top, and sides being connected together to break the joint in connecting the sections, substantially as described.

4. The combination, with the outer conduit or box, substantially of rectangular shape, of the insulating cross-bridges provided with legs or similarly-reduced contact-faces upon their lower faces, and with circular bearings upon their upper faces, and of the paper tubes supported in said bearings, substantially as described.

5. In an underground conduit, the combination of the outer conduit consisting of bottom A, sides B, and top C, connected together by a mortise-and-tenon joint, having the tenon upon the inner corners of the sides, the insulating cross-bridges I, provided with legs K and bearings J, the inner conduit of taper-jointed paper tubes supported upon the cross-bridges, and the water-proof insulating compound filled into the outer conduit, substantially as described.

In testimony whereof I affix my signature, in presence of two witnesses, this 19th day of May, 1888.

GEORGE W. COOK.

Witnesses:
JOHN SCHUMAN,
J. PAUL MAYER.